(12) United States Patent
Hatamura et al.

(10) Patent No.: US 7,204,491 B2
(45) Date of Patent: Apr. 17, 2007

(54) METAL GASKET

(75) Inventors: Koichi Hatamura, 20-16, Yamasaki-cho, Dambara, Minami-ku, Hiroshima-shi, Hiroshima 732-0813 (JP); Takashi Suzuki, Ayabe (JP); Hiroyuki Ogino, Ayabe (JP); Takahiko Sugiura, Kyoto (JP); Yasuyuki Okudaira, Ayabe (JP); Takeshi Wakuda, Katano (JP); Reiji Mahigashi, Fukuchiyama (JP); Keisuke Umehara, Ayabe (JP); Masahisa Kumashiro, Okayama (JP)

(73) Assignees: Koichi Hatamura, Hiroshima-shi (JP); Kokusan Parts Industry Co., Ltd., Toyonaka-shi (JP)

( * ) Notice: Subject to any disclaimer, the term of this patent is extended or adjusted under 35 U.S.C. 154(b) by 164 days.

(21) Appl. No.: 11/038,492

(22) Filed: Jan. 21, 2005

(65) Prior Publication Data

US 2005/0173868 A1   Aug. 11, 2005

(30) Foreign Application Priority Data

Jan. 23, 2004   (JP)   ............................. 2004-016343
Nov. 19, 2004   (JP)   ............................. 2004-335349

(51) Int. Cl.
*F02F 11/00*   (2006.01)
(52) U.S. Cl. ........................................ 277/593; 277/595
(58) Field of Classification Search ......... 277/593–595
See application file for complete search history.

(56) References Cited

U.S. PATENT DOCUMENTS

| | | | | |
|---|---|---|---|---|
| 3,843,141 A | * | 10/1974 | Kuhn | .......................... 277/595 |
| 5,879,012 A | * | 3/1999 | Udagawa | ..................... 277/595 |
| 5,906,376 A | * | 5/1999 | Udagawa et al. | ........... 277/595 |
| 5,988,651 A | * | 11/1999 | Miyaoh | ....................... 277/593 |
| 6,250,645 B1 | * | 6/2001 | Udagawa | ..................... 277/595 |
| 6,279,916 B1 | * | 8/2001 | Stecher | ....................... 277/593 |
| 6,769,696 B2 | * | 8/2004 | Diez et al. | ................... 277/593 |
| 6,893,023 B2 | * | 5/2005 | Kato | ........................... 277/592 |
| 6,951,338 B2 | * | 10/2005 | Kestly | ......................... 277/593 |
| 6,986,516 B2 | * | 1/2006 | Inamura et al. | ............. 277/592 |
| 7,000,924 B2 | * | 2/2006 | Hohe et al. | .................. 277/593 |
| 2006/0061045 A1 | * | 3/2006 | Burg | .......................... 277/593 |
| 2006/0175763 A1 | * | 8/2006 | Duckek et al. | ............. 277/593 |

FOREIGN PATENT DOCUMENTS

| | | |
|---|---|---|
| JP | 11-002324 | 1/1999 |
| JP | 2004-503731 | 2/2004 |
| JP | 2004-144119 | 5/2004 |

\* cited by examiner

*Primary Examiner*—Alison K. Pickard
(74) *Attorney, Agent, or Firm*—Armstrong, Kratz, Quintos, Hanson & Brooks, LLP

(57) ABSTRACT

A metal gasket capable of preventing the occurrence of cracks in a stopper while employing a wave-shaped stopper, improving the contact pressure balance around the bead to enhance the engine performance, and improving the durability of the stopper. The metal gasket is constituted by a gasket component sheet having an opening formed to face a combustion chamber, and the gasket component sheet is provided with a combustion chamber bead surrounding the opening. An inner circumference side stopper lower than the height of the combustion chamber bead is formed along the combustion chamber bead in a portion between the combustion chamber bead and the opening such that at least a section of each wave where stress amplitude is large becomes thin, a thin portion and a thick portion are arranged alternately in each wave, and the hardness of the thin portion is higher than that of the thick portion.

13 Claims, 12 Drawing Sheets

(a)

(b)

(c)

(a)

(b)

(c)

(a)

(b)

(c)

(d)

(a)

(b)

METAL GASKET

BACKGROUND OF THE INVENTION

1. Field of the Invention

The present invention relates to a metal gasket that can be suitably used for automobile engines.

2. Description of the Related Art

A metal gasket widely employed for automobile engines is one which is composed of a single or a plurality of gasket component sheet(s). The gasket component sheet has an opening formed to face a combustion chamber, a bead formed to surround the opening, and a stopper formed on the inner circumference side of the bead to prevent the flattening of the bead.

An example of widely used stoppers is formed by folding back the peripheral edge of a gasket component sheet opening so that this folded part is used as a stopper. Meanwhile, it has recently been proposed, as disclosed in Japanese Patent Kokai Publication No. 2004-144119, to form a stopper with a wave-shaped cross section, by means of press molding, on the inner side of a bead on a gasket component sheet and concentrically with the opening. This Japanese patent publication also discloses a stopper which is formed by pressing a part of a gasket component sheet on the inner circumference side of a bead into a sine wave shape, then smoothing the top and bottom of each wave so that the slopes of the wave become thicker than the top and bottom.

Japanese Patent Kohyo Publication No. 2004-503731 discloses a metal gasket in which a stopper with a sine wave shape is formed by press molding on the inner side of a bead on a gasket component sheet so that the slopes of each wave become thinner than the top and the bottom of the wave.

Formation of a stopper only on the inner circumference side of a bead will lead to a problem of poor balance of contact pressure around a combustion chamber. Therefore, it has also been proposed to form a stopper both on the inner and outer circumference sides of a bead to make the contact pressure balance uniform (see Japanese Patent Kokai Publication No. H11-2324, for example).

It is known that stress amplitude occurs in a metal gasket bead, repeating compression and decompression, due to pressure fluctuation in cylinders of an engine during engine operation, and such stress amplitude constitutes a factor that causes cracks in the bead. When a plurality of waves with a narrow width (with a short wavelength) are arranged to function as a stopper as described in the Japanese Patent Kokai Publication No. 2004-144119 and Kohyo Publication No. 2004-503731, in particular, the ratio of height to width of each wave is so large that fatigue fracture will possibly occur in the stopper if the waves are formed by a same method as the bead. More specifically, according to conventional techniques, a bead is formed using a mold having a molding surface substantially conforming to the final shape of the bead, and this fact raises a problem that a large frictional force is generated between the top of a male punch and a blank metal sheet. The frictional resistance thus generated restricts the lateral extension of the part of the blank metal sheet contacted with the top of the punch. When waves are formed into a required shape, only the opposite slopes of the waves are extended but the top and bottom thereof are not extended significantly. As the result, the thickness at the top and bottom of each wave becomes larger than the thickness of the slopes. This tendency becomes more severe as the ratio of height to width of a bead becomes larger. Therefore, if waves are formed with a large ratio of height to width as described in Japanese Patent Kokai Publication No. 2004-144119 and Kohyo Publication No. 2004-503731, there is a risk that fatigue fracture occurs at the top of the waves in the stopper.

In addition, although Japanese Patent Kokai Publication No. 2004-144119 discloses a stopper having waves the top of which is thin, these waves are formed by press molding a blank metal sheet into a sine wave form and then smoothing the top of each wave. The resistance to compression of the stopper may be enhanced by making the slopes of the wave thicker in this manner. However, cracks are liable to occur at the tops of waves which are subject to maximum stress amplitude. Moreover, it is required to smooth the tops of waves, after the press molding process, with the opening edge fixed to prevent the wave width being enlarged. This makes the manufacturing process complicated and requires a special mold for the smoothing process.

Whereas, according to Japanese Patent Kokai Publication No. H11-2324, a stopper is formed into a thin ring shape from a rigid coating material or sintered material, on the inner and outer circumference sides of a bead, by means of coating, flame spray coating, screen printing, stencil spraying or the like. However, the thermal resistance requirement is particularly stringent to the stopper on the inner circumference side, that is arranged on the side of combustion chamber, and such stopper is subjected to load exerted in the shearing direction due to difference in coefficient of thermal expansion between a cylinder head and a cylinder block. Therefore, there is a risk that the sealing performance is deteriorated as the result of the stopper coming off.

SUMMARY OF THE INVENTION

An object of the present invention is to provide a metal gasket that is capable of effectively preventing the occurrence of cracks in the stopper while using a wave-shaped stopper, and a metal gasket that is capable of enhancing the engine performance by improving the contact pressure balance around a bead and is still capable of improving the durability of the stopper.

The present inventor has made a keen study on configuration of a stopper capable of preventing the occurrence of cracks effectively, and has accomplished the present invention, discovering that cracks can be prevented effectively by increasing the amount of plastic deformation at a part of a stopper where fatigue fracture is liable to occur during press molding of a gasket component sheet, that is, at a part where stress amplitude is large, so that the hardness of such part is increased by work hardening and thus the fatigue limit is increased.

A metal gasket according to a first aspect of the present invention is a single-layer or multiple-layer metal gasket composed of a single or a plurality of gasket component sheet(s) having an opening formed to face a combustion chamber of an engine, at least one of the gasket component sheets being provided with a bead surrounding the opening, wherein an inner circumference side stopper with a wave-shaped cross section lower than the height of the beam is formed along the bead at least either in a portion between the bead and the opening of the gasket component sheet formed with the bead or in a portion of another gasket component sheet opposing the same, such that at least a section of each wave where stress amplitude is large becomes thin, a thin portion and a thick portion are arranged alternately in each wave, and the hardness of the thin portion is higher than that of the thick portion.

When this metal gasket of the first aspect of the invention is implemented as a single layer metal gasket, an opening is formed in a single gasket component sheet, a bead is formed to surround the opening, and an inner circumference side stopper with a wave-shaped cross section is formed in a region between the bead and the opening in the gasket component sheet. When it is implemented as a multiple layer metal gasket, a bead and inner circumferential stopper are formed on any one of the gasket component sheets. The bead and the inner circumferential stopper may be formed either on a same gasket component sheet or on separate gasket component sheets. Also, the bead and the inner circumferential stopper may be formed either in singularity or in plurality.

When the metal gasket of the first aspect is mounted between a cylinder block and a cylinder head and head bolts are tightened, a certain gap is formed around the inner circumference side stopper between the cylinder block and the cylinder head. The deformation of the bead, which is arranged close to the inner circumference side stopper, is reduced by the gap formed by the inner circumference side stopper and the bead will not be compressively deformed to a completely flattened state but only will be collapsed by compression to a certain degree. This means that, in this metal gasket, excessive compressive deformation of the bead is prevented by the inner circumference side stopper, and it is thus possible to prevent deterioration of the sealing performance due to flattening of the bead.

Further, in the metal gasket of the first aspect, the inner circumference side stopper with a wave-shaped cross section is formed, by press molding for example, such that at least a section of each wave where stress amplitude is large becomes thin, a thin portion and a thick portion are arranged alternately in each wave, and the hardness of the thin portion is higher than that of the thick portion. In this manner, a thin portion the hardness and fatigue limit of which is increased in comparison with a thick portion by work hardening is provided at a portion where stress amplitude is large, whereby it is made possible to prevent effectively the fatigue fracture in the portion where stress amplitude is large and to prevent the occurrence of cracks in the stopper. Moreover, the inner circumference side stopper can be formed by press molding only, not requiring the smoothing processing like Japanese Patent Laid-Open Application No. 2004-144119. Therefore, it is possible to prevent the increase of manufacturing processes, and to eliminate the need of using equipment such as a special mold to be used for the smoothing. The thick and thin portions are desirably provided in all the waves, but it is also possible to provide them only in some specific waves.

In this metal gasket, an outer circumference side stopper with a wave-shaped cross section lower than the height of the abovementioned bead may be formed along the bead, at least either in a part of the gasket component sheet having the bead that is located on the outer side of and close to the bead, or in a portion of another gasket component sheet opposing the same, such that at least a section of each wave where stress amplitude is large becomes thin, a thick portion and a thin portion are arranged alternately in each wave, and the hardness of the thin portion is higher than that of the thick portion. In this case, a stopper is formed on each of the inner circumference side and the outer circumference side of the bead. Therefore, well-balanced contact pressure can be obtained around the bead, and thus the circularity of the cylinder holes can be increased to enhance the engine performance while ensuring a high sealing performance. Further, the waves of the outer circumference side stopper are formed similarly to those of the inner circumference side stopper. Therefore, it is possible not only to prevent the occurrence of cracks in the stopper but also to prevent the increase of manufacturing processes, eliminating the need of using equipment such as a special mold for smoothing. The inner circumference side stopper and the outer circumference side stopper may have a same height or may have a different height to optimize the contact pressure balance.

A groove may be formed along a portion where stress amplitude is large so that such portion becomes thin. When such groove is formed at the same time as the press molding of the stopper, the portion where the groove is formed can be formed thin, so that the hardness and fatigue limit of such portion is increased by work hardening, and the occurrence of cracks due to stress amplitude can be prevented effectively. When such groove is formed, it is preferable that the groove is not formed at the bead-side edge of a wave located adjacent to the bead for avoiding complicating the construction of the mold.

Arrangement of thin and thick portions in a wave may be, for example, such that a thin portion is provided at the top and bottom of the wave while a thick portion is provided at an intermediate portion in the height direction of the opposite slopes of the wave. The arrangement may also be such that a thin portion is provided at the top side and bottom side in the opposite slopes of the wave while a thick portion is provided at the top and bottom of the wave and at an intermediate portion in the height direction of the opposite slopes of the wave. Further, the arrangement may also be such that a thin portion is provided is provided at the top and at a bottom side in the opposite slopes of the wave while a thick portion is provided at the bottom and at an intermediate portion in the height direction of the opposite slopes of the wave. This means that stress amplitude acting on the stopper is larger around the top and bottom of each wave. Therefore, by providing a thin portion at the top or bottom of the wave, or at the top side or bottom side in the opposite slopes of the wave, the hardness and fatigue limit of such portion can be increased and the occurrence of cracks due to stress amplitude can be prevented effectively.

The stopper may be formed to have a sine wave-shaped cross section, or to have a flattened wave-shaped cross section in which a flat surface is formed on the upper or lower face of the top or bottom of each wave. Further, the cross sectional shape of the stopper may be varied from the sine waveshape to the flattened shape stepwise or continuously in the circumferential direction, so as to equalize the contact pressure. It is also possible that, when used for an in-line multiple-cylinder engine, the stoppers surrounding the cylinders arranged on the opposite side are formed to have a different cross sectional shape from that of the stopper surrounding the cylinder arranged at the center. For example, the stoppers surrounding the side cylinders may be formed to have a sine wave-shaped cross section and the stopper surrounding the center cylinder may be formed to have a flattened wave-shaped cross section.

The stopper may be formed either continuously or intermittently in the circumferential direction. When formed intermittently, the stopper is preferably omitted in the vicinity of an area where ahead bolt is tightened for fastening the cylinder head to the cylinder block. More specifically, the contact pressure acting on the bead and the stopper becomes lower as the part of the bead or stopper subjected to such contact pressure recedes from the head bolt tightening portion. Therefore, the stopper can be omitted in an area close to the head bolt tightening portion so that the contact pressure acting on a portion of the bead away from the head bolt tightening portion is increased to adjust the contact pressure acting on the bead to become uniform in the entire circumference. This arrangement is preferable since the sealing performance can be improved in this manner.

It is also preferable to vary the height of waves of the stopper in the circumferential direction, or to vary the number of waves in the circumferential direction of the stopper. Similarly to the case where the stopper is formed intermittently as described above, the sealing performance can be improved by varying the height or number of waves in the circumferential direction to adjust the contact pressure acting on the bead. Specifically, the height of the waves may be made lower, or the number of the waves may be made smaller as closer to the head bolt tightening portion, so that the contact pressure acting on the bead can be adjusted uniformly. It is further possible to adjust the contact pressure acting on the bead by combining a stopper formation portion, a wave height, and a number of waves as required.

It is also preferable that the waves of the stopper be projected to the same side as the bead is projected. When a metal gasket having this arrangement is mounted between a cylinder head and a cylinder block, the gasket component sheet can be prevented from being elastically deformed between the stopper and bead. When a metal gasket formed by overlapping a gasket component sheet provided with a bead and another gasket component sheet provided with a stopper, the term "the bead projecting side" means the side of the surface facing the bead.

The wave of the stopper may be formed into a complete circle or into a wave shape oscillating in a radial direction of the opening. In case of the stopper having a wave shape oscillating in a radial direction of the opening, the wavelength and amplitude of such oscillation may be set uniformly for the entire circumference, whereas the wavelength and/or amplitude of such oscillation may be adjusted to adjust the contact pressure acting on the bead.

A metal gasket according to a second aspect of the present invention is a single-layer or multiple-layer metal gasket composed of a single or a plurality of gasket component sheet(s) having an opening to face a combustion chamber of an engine, at least one of the gasket component sheets being provided with a bead surrounding the opening, wherein an inner circumference side stopper for preventing the bead from collapsing is formed at least either in a portion between the bead and the opening of the gasket component sheet formed with the bead or in a portion of another gasket component sheet opposing the same; an outer circumference side stopper for preventing the bead from collapsing is formed at least either in a portion close to and on the outer side than the bead in the gasket component sheet formed with the bead or in a portion of another gasket component sheet opposing the same; and the inner circumference side stopper is constituted by a plurality of auxiliary beads which are formed along the bead in the peripheral edge of the opening in the gasket component sheet, the inner circumference side stopper being formed in a wave-shaped cross section lower than the height of the bead.

In this metal gasket of the second aspect, the inner and outer circumference side stoppers are formed on the inner and outer circumference sides of the bead, respectively. Therefore, it is possible to obtain a well-balanced contact pressure around the bead, and to increase the circularity of cylinder holes to improve the engine performance while ensuring sufficient sealing performance. Moreover, the inner circumference side stopper is constituted by a plurality of auxiliary beads formed along the bead at the peripheral edge of the opening of the gasket component sheet, which makes it possible to effectively prevent the inner circumference side stopper from coming off from the gasket component sheet, and hence to prevent deterioration of sealing performance caused by the coming off of the inner circumference side stopper. Further, the outer circumference side stopper, which can be formed arbitrarily, may possibly come off as a result of aging or the like. Even if it comes off, however, it will not lead to a serious problem since the sealing performance will be ensured sufficiently by the inner circumference side stopper.

Preferred embodiments of this metal gasket of the second aspect include an arrangement in which the outer circumference side stopper is provided by dividing the gasket component sheet to be provided with the outer circumference side stopper into an inner circumference side component sheet located close to the opening and an outer circumference side component sheet corresponding to the other part of the gasket component sheet and partially overlapping the inner circumference side component sheet and the outer circumference side component sheet to form the outer circumference side stopper; an arrangement in which the outer circumference side stopper is provided by forming a build-up portion from a material having thermal resistance and compressive resistance; an arrangement in which the outer circumference side stopper is provided by welding a ring-shaped stopper plate; an arrangement in which the outer circumference side stopper is provided by forming a plurality of auxiliary beads along the bead so that the outer circumference side stopper is formed by the plurality of auxiliary beads to have a wave-shaped cross section lower than the height of the bead; and an arrangement in which the stopper formed by the plurality of auxiliary beads to have a wave-shaped cross section is formed along the bead such that a section of each wave where stress amplitude is large becomes thin, a thin portion and a thick portion are arranged alternately in each wave, and the hardness of the thin portion is higher than that of the thick portion. The stopper with a wave-shaped cross-section of the metal gasket of the second aspect can be constructed similarly to the stopper of the metal gasket of the first aspect.

According to the first aspect of the present invention, the metal gasket is capable of preventing excessive compressive deformation of the bead by the presence of the inner circumference side stopper and thus capable of preventing deterioration of the sealing performance caused by flattening of the bead. In addition, since the inner circumference side stopper with a wave-shaped cross-section is formed, for example by press molding, such that at least a section of each wave where stress amplitude is large becomes thin, a thin portion and a thick portion are arranged alternately in each wave, and the hardness of the thin portion is higher than that of the thick portion, the thin portion whose hardness and fatigue limit have been increased by work hardening in comparison with those of the thick portion is arranged in a portion where stress amplitude is large. Therefore, it is possible to effectively prevent fatigue fracture at the section where stress amplitude is large, and hence to prevent occurrence of cracks in the stopper. Moreover, since the inner circumference side stopper can be formed by press molding only, the increase of manufacturing processes can be prevented and the need of using equipment such as a special mold for smoothing can be avoided.

If an outer circumference side stopper with a wave-shaped cross section lower than the height of the bead is further provided along the bead in at least either in a part close to and on the outer side of the bead in the gasket component sheet where the bead is formed or in a part of another gasket component sheet facing the same, such that a section of each wave where stress amplitude is large becomes thin, a thick portion and a thin portion wave are alternately arranged in each wave, and the hardness of the thin portion is higher than that of the thick portion, a well-balanced contact pressure can be obtained around the bead, and the circularity of the cylinder hole can be increased to enhance the engine performance while ensuring sufficient sealing performance. Further, since the waves of the outer circumference side stopper are formed similarly to those of the inner circumference side stopper, the occurrence of cracks in the stopper can be prevented. Moreover, the increase of manufacturing processes can be prevented while eliminating the need of equipment such as a special mold for smoothing.

When a groove is formed along a portion where stress amplitude is large t to make such portion thin, this portion where the groove is formed can be made thinner, and the hardness and fatigue limit of this portion can be enhanced by work hardening to prevent effectively the occurrence of cracks due to stress amplitude.

The hardness and fatigue limit of portions of each wave such as the top or bottom, or the top side or bottom side in the opposite slopes of the wave where stress amplitude is large can be increased to effectively prevent the occurrence of cracks in such portions, by implementing any of the followings: a thin portion is provided at the top and bottom of each wave while a thick portion is provided at an intermediate portion in the height direction of the opposite slopes of the wave; a thin portion is provided at the top side and bottom side in the opposite slopes of each wave while the thick portion is provided at the top and bottom and at an intermediate portion in the height direction of the opposite slopes of the wave; a thin portion is provided at the top and at the bottom side in the opposite slopes of each wave while a thick portion is provided at the bottom and at an intermediate portion in the height direction of the opposite slopes of the wave.

When the stopper is formed to have a flattened wave-shaped cross section having a flat surface on the upper or lower face of the top or bottom of each wave, the rigidity of the stopper can be enhanced.

When the stopper is provided in appropriate portion, or the height or number of waves is set appropriate, by forming the stopper intermittently, or varying the height of the waves in the circumferential direction of the stopper, or varying the number of waves in the circumferential direction of the topper, the contact pressure acting on the bead can be adjusted to enhance the sealing performance.

By projecting the waves of the stopper to the same side as the bead is projected, the gasket component sheet can be prevented from being elastically deformed between the stopper and the bead when the metal gasket is mounted between a cylinder head and a cylinder block.

The formability of the stopper can be improved by forming the waves of the stopper into a complete circle shape. When the stopper is formed into waves oscillating in a radial direction of the opening, the contact pressure acting on the bead can be adjusted appropriately by adjusting the wavelength and/or amplitude of the waves.

In the metal gasket according the second aspect of the present invention, the contact pressure on the inner circumference side and the contact pressure on the outer circumference side can be well balanced in the vicinity of the bead by providing the inner circumference side stopper on the inner circumference side and the outer circumference side stopper on the outer circumference side. Therefore, the circularity of the cylinder hole can be increased to enhance the engine performance while ensuring sufficient sealing performance. Moreover, the inner circumference side stopper can be reliably prevented from coming off from the gasket component sheet, and thus the deterioration of sealing performance due to coming off of the inner circumference side stopper can be prevented reliably.

The outer circumference side stopper also can be prevented from coming off reliably when the outer circumference side stopper is provided by dividing the gasket component sheet on which the outer circumference side stopper is to be provided into an inner circumference side component sheet located close to the opening and an outer circumference side component sheet corresponding to the other part of the gasket component sheet and overlapping the inner circumference side component sheet and the outer circumference side component sheet, or when the outer circumference side stopper is provided by forming a plurality of auxiliary beads along the bead so that the outer circumference side stopper is formed by the plurality of auxiliary beads into a wave-shaped cross section lower than the height of the bead. Additionally, if the outer circumference side stopper is provided by forming the auxiliary beads, it is possible to form the inner and outer circumference side stoppers at the same time by press molding or the like, and thus the formability of the gasket component sheet can be improved.

If the stopper formed by the plurality of auxiliary beads into a wave-shaped cross section as described above is provided along the bead such that a section of each wave where stress amplitude is large becomes thin, a thin portion and a thick portion are arranged alternately in the wave, and the hardness of the thin portion is higher than that of the thick portion, the same effect as the metal gasket according to the first aspect can be obtained.

DESCRIPTION OF THE PREFERRED EMBODIMENTS

Preferred embodiments of the present invention will now be described with reference to the drawings.

First Embodiment

Figure 1:
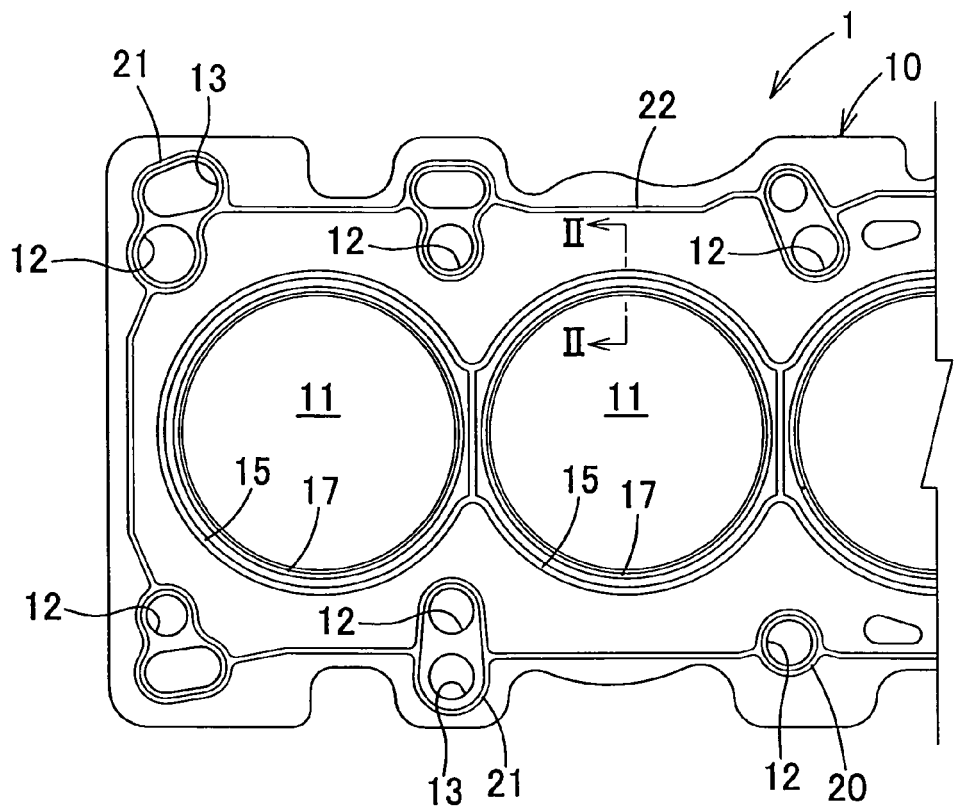
FIG. 1 is a plan view showing principal parts of a metal gasket.
Figure 2:
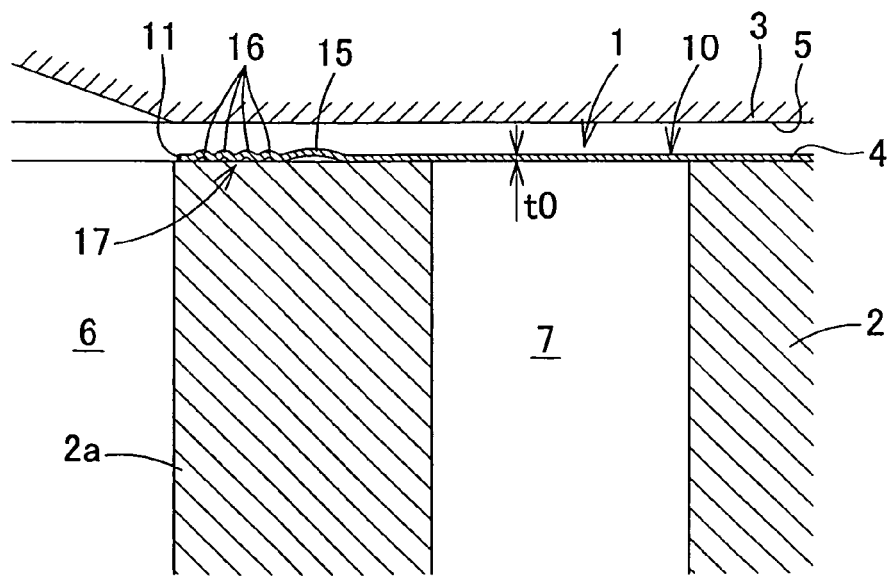
FIG. 2 is a longitudinal sectional view taken along the line II—II in FIG. 1, showing the state of an engine immediately before the metal gasket is mounted between a cylinder block and a cylinder head.

A metal gasket 1 shown in FIGS. 1 and 2 is a metal gasket for in-line multiple-cylinder engines. This metal gasket 1 is designed to be interposed between joint surfaces 4 and 5 of a cylinder block 2 and a cylinder head 3 to seal the joint surfaces 4 and 5 which face a combustion chamber 6, a water jacket 7, a lubricating oil passage (not shown) and so on. The metal gasket 1 according to the present invention is applicable to engines having a cylinder block of cast iron, and engines having a cylinder block and a cylinder head principally made from a light alloy such as aluminum alloy or magnesium alloy. In this embodiment, the metal gasket 1 according to the present invention is applied to an engine which has an open deck type cylinder block 2 in which the top face of a water jacket 7 is open, and the cylinder block 2 and a cylinder head 3 of which are made from an aluminum alloy.

The metal gasket 1 is composed of a single gasket component sheet 10 which is interposed between the joint surfaces 4 and 5 of the cylinder block 2 and cylinder head 3 to cover substantially all over the joint surfaces 4 and 5.

The gasket component sheet 10 is formed of a stainless steel sheet such as SUS301 stainless steel sheet according to JIS standard. The outline of the gasket component sheet 10 is formed into a substantially identical shape with that of the joint surface 4 of the cylinder block 2. If the thickness of the gasket component sheet 10 is less than 0.15 mm, the rigidity of the beads 15, 20–22 will become too low to provide a sufficient contact pressure, whereas if the thickness exceeds 0.4 mm, cracks may occur in the beads 15, 20–22 due to deterioration of the material after processing or excessive tightening of a head bolt. Therefore, the thickness of the gasket component sheet 10 is set preferably to 0.15 to 0.4 mm, more preferably to a range from 0.15 to 0.35 mm, and particularly preferably to a range from 0.2 to 0.25 mm. The gasket component sheet 10 can be formed of a metal sheet only, but also can be formed of a coated metal sheet having at least one of the surfaces coated with a rubber layer or the like for improving the sealing performance of the metal gasket 1.

A plurality of openings 11 are formed in a substantially central portion in the transverse direction of the gasket component sheet 10, at intervals in the longitudinal direction so as to face a combustion chamber 6. A plurality of cooling water holes (not shown) are formed in a specific arrangement on the outside of the openings 11 in association with a water jacket 7 of the cylinder block 2. A plurality of bolt insertion holes 12, through which head bolts (not sown) are inserted for fastening the cylinder head 3 to the cylinder block 2, are formed on the outside of the cooling water holes at substantially regular intervals so as to surround the openings 11, so that the cylinder head 3 can be fastened to the cylinder block 2 by means of the bolts in a well-balanced manner. An oil hole 13 through which lubricating oil flows is formed on the outside of specific bolt insertion holes 12 so that the lubricating oil is supplied from the cylinder block 2 side to the cylinder head 3 side for lubricating a valve mechanism or the like.

The gasket component sheet 10 has a combustion chamber bead 15 surrounding the combustion chamber 6, an inner circumference side stopper 17 composed of a plurality of waves 16 an arranged at an inner side from the combustion chamber bead 15, a bolt hole bead 20 surrounding the bolt insertion hole 12, a bolt/oil hole bead 21 surrounding the combination of the bolt insertion hole 12 and the oil hole 13, and an outer circumferential bead 22 surrounding the whole of the plurality of bolt hole beads 20 and bolt/oil hole beads 21. The outer circumferential bead 22 may be arranged not to surround the bolt hole beads 20 or bolt/oil hole beads 21, as long as it is arranged to surround the cooling water holes. Further, the bolt hole beads 20, the bolt/oil hole beads 21 and the outer circumferential bead 22 may be constituted either by a round bead having a circular arc section or by a stepped bead with a stepped shape.

The shapes, numbers and arrangement of the openings 11, cooling water holes, bolt insertion holes 12, and oil holes 13, as well as the shapes, numbers and arrangement of the combustion chamber beads 15, bolt hole beads 20, bolt/oil hole beads 21, and outer circumferential bead 22 in the gasket component sheet 10 are determined as required according to the configuration of the engine or the like.

The inner circumference side stopper 17 and the combustion chamber bead 15 are arranged on the side closer to the combustion chamber 6 than the water jacket 7 and so as to face the top face of a cylindrical cylinder inner peripheral wall 2a of in the cylinder block 2. The combustion chamber bead 15 is arranged in a substantially central part in the thickness direction of the cylinder inner peripheral wall 2a.

The inner circumference side stopper 17 is formed by press molding only, and is formed to have a cross sectional shape consisting of four annular waves 16 substantially concentrical with the combustion chamber bead 15. The center line in the thickness direction of the inner circumference side stopper 17 is formed in a substantially sine wave shape. The number of waves 16 can be set arbitrarily, but it is preferable to provide at least two waves 16 for ensuring the function as the inner circumference side stopper 17. While the inner circumference side stopper 17 may be formed by a single press molding process, it may also be formed by a plurality of press molding processes such that a desired shaped is obtained step-by-step.

The width of each wave 16 is set to be smaller than the width of the combustion chamber bead 15, and the height of the waves 16 is set to be smaller than the height of the combustion chamber bead 15 in its natural state. While the waves 16 can be projected to the opposite side from the side where the combustion chamber bead 15 is projected, it is preferable that the waves 16 be projected to the same side as the combustion chamber bead 15 is projected while placing the bottom face of each wave 16 substantially in the same plane as the bottom face of a flat general portion of the gasket component sheet 10 in order to minimize the deformation of the gasket component sheet 10 between the waves 16 and the combustion chamber bead 15.

The inner circumference side stopper 17 is press molded such that at least a section of the waves 16 constituting the same where stress amplitude is large during engine operation becomes thin and a thin portion and a thick portion are arranged alternately in each wave 16. Work hardening is induced during pressing molding of the inner circumference side stopper 17 and the portions where stress amplitude is large are made thin. This work hardening increases the hardness and fatigue limit of the thin portions to make these portions more resistible against fatigue fracture. Therefore, the durability against stress amplitude of the thin portions can be enhanced and the occurrence of cracks in these portions can be prevented. While the portions where stress amplitude becomes large are determined partially according to the shape of the inner circumference side stopper 17, they are basically located at least at the top 16a and bottom 16c of each wave 16, and at a top 16a side and bottom 16c side in the slopes 16b. As particular methods for forming the thin portion by press molding, preferable are a method of designing a mold such that the mold part for forming the thin portion has a smaller radius, and a method of providing the mold part corresponding to the thin portion with a ridge such that a groove with a circular-arc cross section is formed along the portion where a stress amplitude becomes large, but other methods also can be employed.

Specific arrangement of thin and thick portions will now be described. It should be noted that, however, as long as a thin portion is disposed at the top 16a and bottom 16c of each wave 16 and at the top 16a side and bottom 16c side in the slopes 16b, other configurations than those described below also can be employed.

Figure 3:
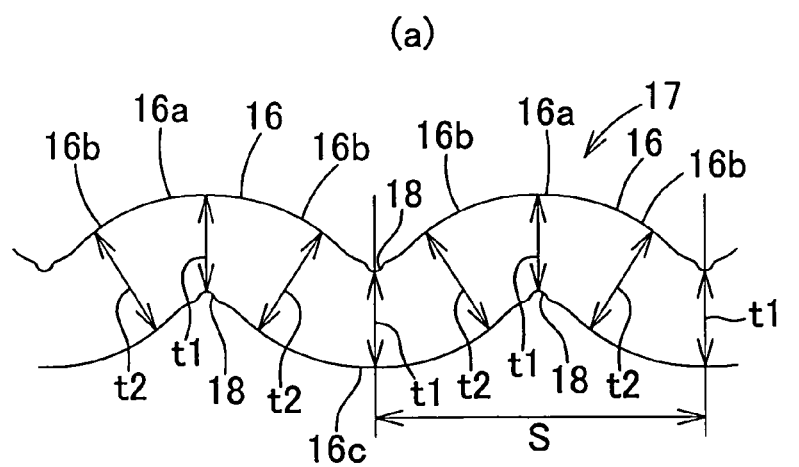
FIGS. 3A, 3B and 3C are sectional views showing various types of waves.
Figure 3:
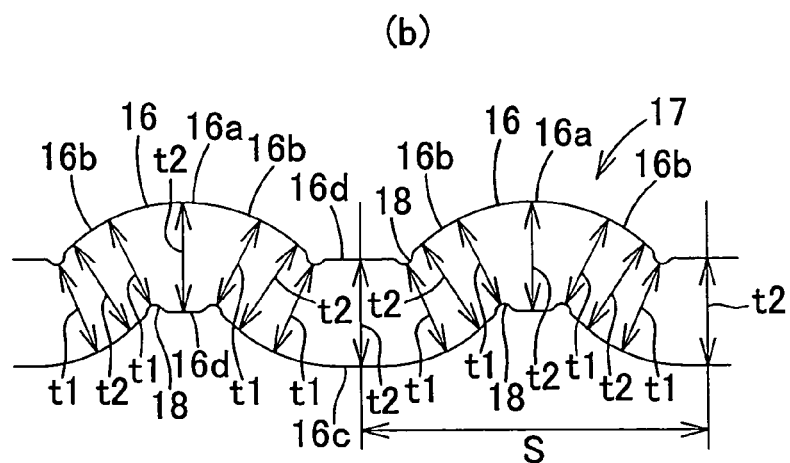
Figure 3:
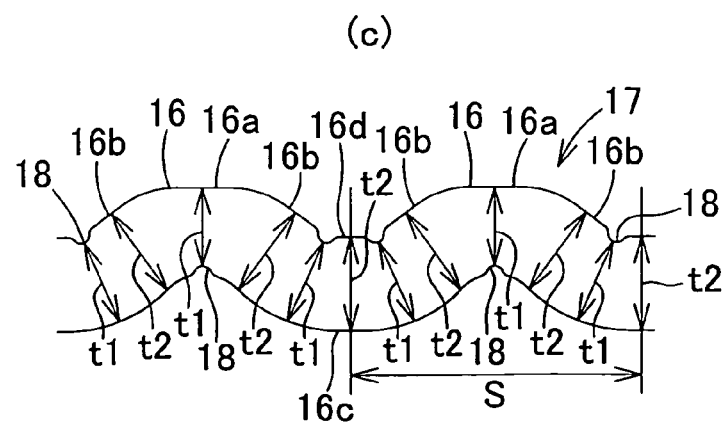

As shown in FIG. 3A, the tops 16a and bottoms 16c, and upper and lower faces in their vicinity of the inner circumference side stopper 17 are formed by curved surfaces having a uniform radius, so that the inner circumference side stopper 17 is formed into a substantially sine wave shape. In this case, thin portions and thick portions are formed within one cycle S of each wave 16 such that the top 16a and the bottom 16c corresponding to grooves 18 have a smallest thickness t1 and the thickness gradually increases towards the slopes 16b up to a largest thickness t2 at a substantially central portion in the height direction of the slopes 16b.

As shown in FIG. 3B, a flat surface 16d is formed at the bottom of the upper face and at the top of the lower face of the inner circumference side stopper 17, while the other portions are formed by generally curved surfaces, so that the inner circumference side stopper 17 is formed into a flattened sine wave shape. In this case, thin portions and thick portions are formed within one cycle S of each wave 16 by varying the thickness gradually such that the top 16a and the bottom 16c, and intermediate portions in the height direction of the slopes 16b have a largest thickness t2 and the portions of the slopes 16b located on the top 16a side and bottom 16c side and associated with respective grooves 18 have a smallest thickness t1. It should be noted that, however, the thickness t1 of the portion at the top 16a side in the slopes 16b of each wave 16 may be set equal to or different from the thickness t1 of the portion at the bottom 16c side in he slopes 16b. Also, the thickness t2 of the top 16a and bottom 16c of each wave 16 may be set equal to or different from the thickness t2 in the height direction of the slopes 16b.

As shown in FIG. 3C, a flat surface 16d is formed at the bottom of the upper face while the other portions are formed by generally curved surfaces, so that the inner circumference side stopper 17 is formed in a flattened substantially sine wave shape. In this case, thin portions and thick portions are formed within a cycle S of each wave 16 by gradually varying the thickness such that the top 16a and the bottom 16c side portions of the slopes 16b opposing respective grooves 18 have a smallest thickness t1 and the bottom 16 and substantially central portion in the height direction of the slopes 16b have a largest thickness t2. It should be noted that, however, the thickness t1 at the top 16a of each wave 16 may be set equal to or different from the thickness t1 at the bottom 16c side portion of the slopes 16b. Also, the thickness t2 at the bottom 16c of each wave 16 may be set equal to or different from the thickness t2 in the height direction of the slopes 16b.

The waves 16 as shown in FIGS. 3A through 3C may be formed upside down. Further, as for the waves 16 disposed adjacent to the combustion chamber bead 15, the grooves to be formed on the side of the combustion chamber bead 15 may be omitted to avoid the complication of mold configuration.

In the gasket component sheet 10, a thickness t0 of the flat general portion other than the inner circumference side stopper 17 (see FIG. 2), a thickness t1 of the thin portion and a thickness t2 of the thick portion of each wave 16 are set to satisfy the following relationships (1) to (3), where a and b are constants:

$$t1 = a \times t0 (0.5 = a = 0.95) \quad (1)$$

$$t2 = b \times t0 (0.5 = b = 0.95) \quad (2)$$

$$a < b \quad (3)$$

More specifically, if the constants a and b are less than 0.5, the thicknesses of the thin portion and thick portion become both so thin that the inner circumference side stopper 17 becomes more liable to be broken. Whereas, if the constants a and be are larger than 0.95, the effect of work hardening, which would be obtained by making the sheet thinner, can hardly be expected. Therefore, it is preferable that the costants a and b be set as 0.5=a=0.95 and 0.5=b=0.95, respectively. Thus, when the press molding is conducted such that the thin portion has a thickness smaller than that of the general portion, the hardness and fatigue limit of the thin portion can be increased by the work hardening caused by the press molding, and the fatigue resistance of the thin portion can be enhanced. Additionally, when the thickness of the thick portion is made thicker than the thin portion but slightly thinner than the flat general portion, the hardness and fatigue limit of the thick portion can be increased by the work hardening caused by the press molding, and thus the fatigue fracture of the inner circumference side stopper 17 as a whole can be prevented effectively.

This metal gasket 1 is mounted to the engine by fastening the cylinder head 3 to the cylinder block 2 by means of head bolts with the metal gasket 1 interposed between the cylinder block 2 and the cylinder head 3. When the metal gasket 1 is mounted in this manner, the combustion chamber bead 15 is compressively deformed by a difference in height between the combustion chamber bead 15 and the inner circumference side stopper 17 to seal the combustion chamber 6. Additionally, a gap is formed in the vicinity of the combustion chamber bead 15 by the inner circumference side stopper 17, whereby excessive compressive deformation of the combustion chamber bead 15 can be prevented and thus the combustion chamber bead 15 can be prevented from being flattened. Moreover, the thin portions, the hardness and fatigue limit of which have been increased by the work hardening, are disposed at portions of the inner circumference side stopper 17, where stress amplitude is large, namely at the tops 16a and bottoms 16c of the waves 16 and at the top 16a side and bottom 16c side portions of the slopes 16b of the waves 16. Therefore, the fatigue fracture of the waves 16 can be prevented effectively. Further, since the inner circumference side stopper 17 can be formed by the press molding only, the metal gasket 1 can be manufactured by utilizing existing equipment effectively.

It should be noted that the cross-sectional shape of the inner circumference side stopper 17 is not limited to a sine wave shape, and may assume an arbitrary wave shape such as a rectangular or trapezoidal wave shape. In addition, the height (amplitude) and the width (wavelength) of waves 16 may differ in the inner circumference side stopper 17 between the center side and the outside in the radial direction. Specifically, if the height of the waves 16 on the center side is made higher or the width thereof is made smaller, the air tightness of the combustion chamber 6 can be enhanced.

Further, it is also possible to vary the number of the waves 16 in the circumferential direction of the inner circumference side stopper 17, to vary the height of the wave 16, or to vary the width of the waves 16 in the circumferential direction of the inner circumference side stopper 17. By varying the number, the height or the width of the waves 16 in the circumferential direction, the contact pressure acting on the bead can be adjusted to improve the sealing performance. Specifically, the setting can be made such that the number of the waves 16 becomes smaller, the height of the waves 16 becomes lower, or the width of the waves 16 becomes larger towards the bolt insertion holes 12 through which the head bolts are inserted, and thus the contact pressure acting on the combustion chamber bead 15 can be adjusted uniformly. Further, it is also possible to adjust the contact pressure acting on the combustion chamber bead 15 by combining the number, the height and the width of the waves 16 as required.

It is also possible that a synthetic resin material or metallic material having thermal resistance and compressive resistance is built up or deposited in between the adjacent waves 16 in the inner circumference side stopper 17 by means of pattern printing, metal press fitting, metal flame spray coating, or material application with a dispenser so as to fill the valleys between the waves 16 with such material. When this is done, the inner circumference side stopper 17 is allowed to exhibit its function at full. Such metallic material or synthetic resin material may be built up or deposited between all of the waves 16 or between specific adjacent waves 16 only. Also, the material may be built up continuously in the circumferential direction, or may be built up partially such that a uniform contact pressure is acting on the combustion chamber bead 15. The synthetic resin material or metallic material thus built up or deposited has its external surface placed at the same level as the top 16a or bottom 16c of the waves 16. The external surface of the material may either cover the top 16a or bottom 16c, or expose the top 16a or bottom 16c to the outside.

Second Embodiment

Figure 4:
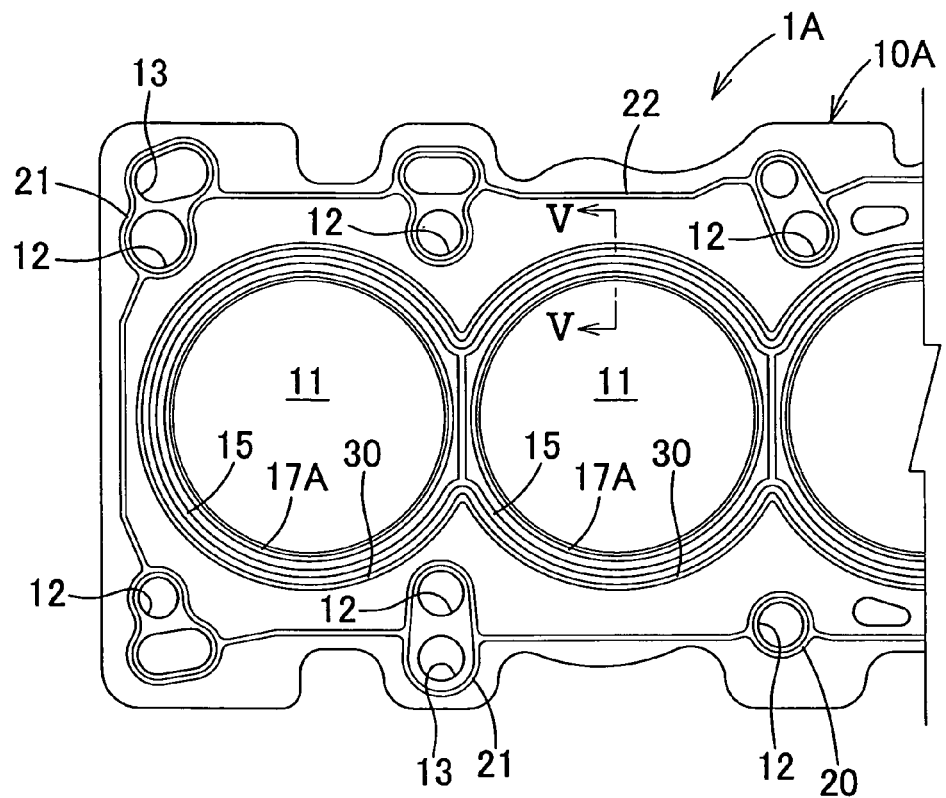
FIG. 4 is a plan view showing principal parts of a metal gasket having another configuration.
Figure 5:
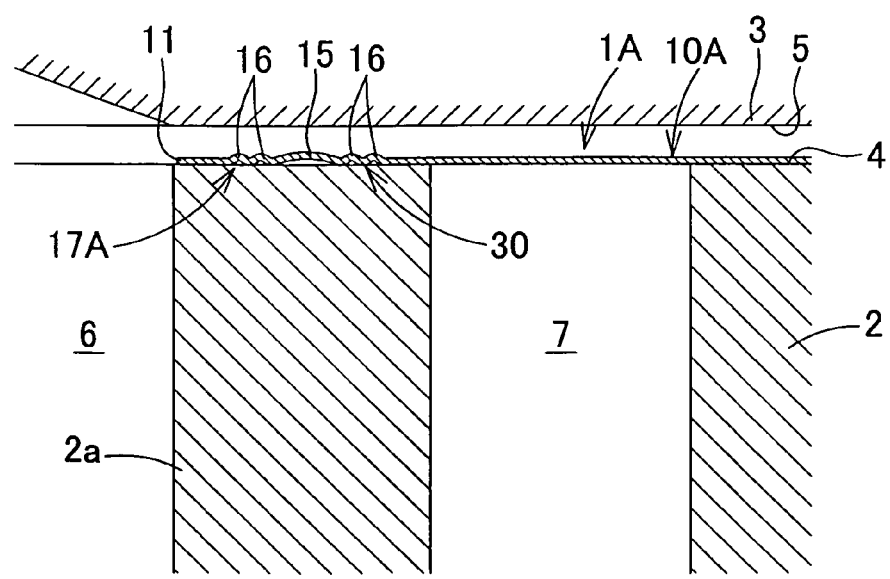
FIG. 5 is a longitudinal sectional view taken along the line V—V in FIG. 4, showing the state of an engine immediately before the metal gasket is mounted between a cylinder block and a cylinder head.

As shown in FIGS. 4 and 5, a metal gasket 1A according to this second embodiment is a single layer metal gasket composed of a gasket component sheet 10A, and is constituted by partially modifying the gasket component sheet 10 of the metal gasket 1 of the first embodiment described above. In FIGS. 4 and 5, like components to those of the first embodiment are designated with like reference numerals and description thereof is omitted.

The gasket component sheet 10A of the metal gasket 1A is provided with an inner circumference side stopper 17A with a wave-shaped cross section having two waves 16, instead of the inner circumference side stopper 17 of the gasket component sheet 10 according to the first embodiment, and is further provided with an outer circumference side stopper 30 with a wave-shaped cross section having two waves 16. The outer circumference side stopper 30 is provided on the outside of and close to the combustion chamber bead 15 so as to surround the entire of the combustion chamber bead 15. While the metal gasket 1A is applicable to engines having a cylinder block of cast iron, it is suitably applicable for engines having a cylinder block and a cylinder head principally made from a light alloy such as aluminum alloy or magnesium alloy. The metal gasket 1A is particularly suitably applicable to an open deck type engine having a water jacket 7 the top of which is open, because the metal gasket 1A is helpful to prevent the deterioration of circularity of a cylinder inner peripheral wall 2a of a cylinder block 2 constituting a combustion chamber 6, which is otherwise liable to occur in this type of engines.

Like the waves 16 of the inner circumference side stopper 17 of the first embodiment, the waves 16 of the toppers 17A and 30 are also designed such that a thin portion, whose hardness and fatigue limit have been increased by the work hardening, is disposed at the top 16a and bottom 16c of each wave 16, and at top 16a side and bottom 16c side portions in the opposite slopes 16b, where stress amplitude is large.

While the number of the waves 16 in the stoppers 17A and 30 may be set arbitrarily, it is preferable to provide at least two waves 16 for ensuring the function as the stoppers. It is also possible to differentiate the number, height or width of the waves 16 between the inner circumference side stopper 17A and the outer circumference side stopper 30. For example, the number of waves 16 in the inner circumference side stopper 17A can be set larger than the number of waves 16 in the outer circumference side stopper 30, or the height of the wave 16 in the inner circumference side stopper 17A can be set greater than that of the waves 16 in the outer circumference side stopper 30, or the width of the waves 16 in the inner circumference side stopper 17A can be set greater than that of the waves 16 in the outer circumference side stopper 30, so that the air tightness of the combustion chamber 6 can be improved. Further, the waves 16 of the stoppers 17A and 30 may be projected to the opposite direction from the direction the combustion chamber bead 15 is projected, but it is preferable that the waves 16 be protruded to the same direction as the combustion chamber bead 15 in order to ensure that these stoppers function sufficiently as the stopper 17 for the combustion chamber bead 15.

When using this metal gasket 1A, the metal gasket 1A is incorporated in the engine by fastening the cylinder head 3 to the cylinder block 2 by the use of head bolts with the metal gasket 1A interposed between the cylinder block 2 and the cylinder head 3. When the metal gasket 1A is mounted in this manner, the combustion chamber bead 15 is compressively deformed by the difference in height between the combustion chamber bead 15 and the stoppers 17A and 30 to seal the combustion chamber 6. Further, a gap is formed by the stoppers 17A and 30 in the vicinity of the combustion chamber bead 15, whereby excessive compressive deformation of the combustion chamber bead 15 is prevented, and thus the combustion chamber bead 15 is prevented from being flattened. Moreover, the tightening load from the head bolt is distributed over and exerted in a well-balanced manner to the top face of the cylinder inner peripheral wall 2a by the combustion chamber bead 15 and stoppers 17A and 30. Therefore, the deformation in a radial direction of the cylinder inner peripheral wall 2a can be minimized to improve the circularity of the cylinder hole and hence to improve the engine performance. Further, similarly to the stopper 17 according to the first embodiment described above, a synthetic resin material or metallic material having thermal resistance and compressive resistance may be built up or deposited in between the adjacent waves 16 in at least one of the stoppers 17A and 30 by means of pattern printing, metal press fitting, metal flame spray coating, or material application with a dispenser so as to enhance the functions as the stopper 17.

Further, the fatigue fracture of the wave 16 can be prevented effectively, since a thin portion, whose hardness and fatigue limit have been enhanced by the work hardening, is provided at the top 16a and bottom 16c of each waves 16 of the stoppers 17A and 30 and at the top 16a side and bottom 16c side portions of the slopes 16b. Still further, since the stoppers 17A and 30 can be formed by press molding only, metal gasket 1A can be manufactured by utilizing existing equipment effectively.

Figure 6:
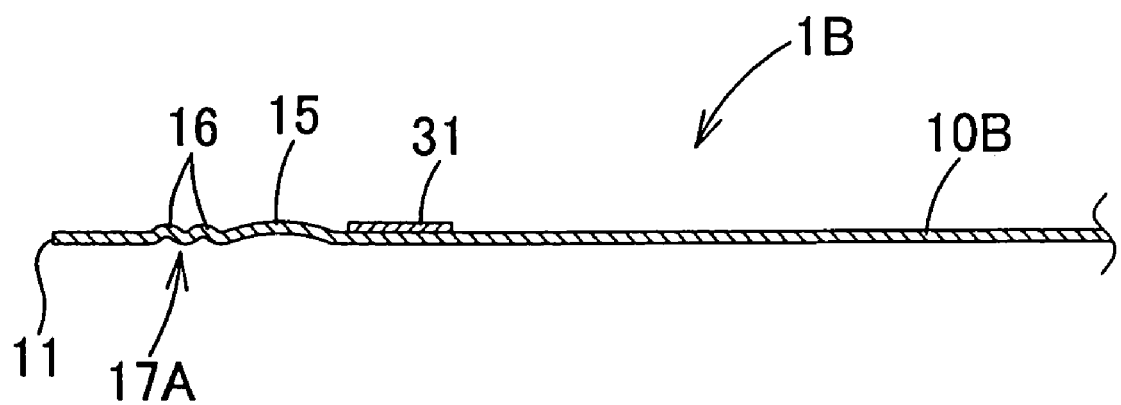
FIG. 6 is a longitudinal sectional view showing the vicinity of a stopper of a metal gasket having another configuration.

It should be noted that the thermal resistance and other properties required for the outer circumference side stopper 30 are not as high as those for the inner circumference side stopper 17A. Therefore, as shown in FIG. 6, a metal gasket 1B may be formed by a gasket component sheet 10B having no outer circumference side stopper 30 and this gasket component sheet 10B may be provided with an outer circumference side stopper 31 formed by depositing a synthetic resin material or metallic material having thermal resistance and compressive resistance by means of pattern printing, metal flame spray coating, or material application with a dispenser, or by welding a ring-shaped stopper plate.

Third Embodiment

Description so far has been made on the first and second embodiments in which the metal gaskets 1, 1A and 1B is constituted by a single gasket component sheet 10, 10A and 10B, respectively. However, the present invention is also applicable to a multiple-layer metal gasket composed of a plurality of gasket component sheets.

Figure 7:
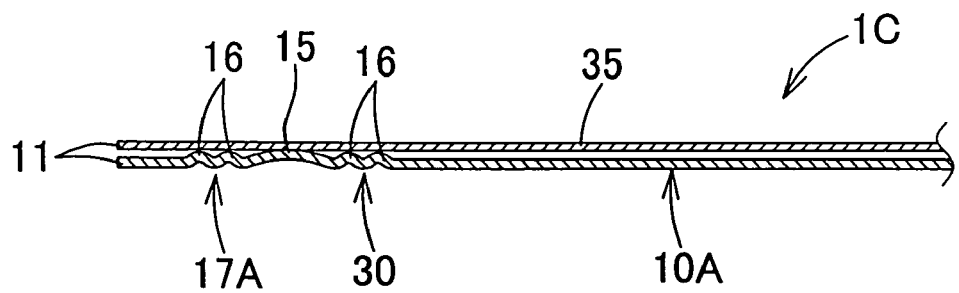
FIGS. 7A through 7C are longitudinal sectional views showing the vicinity of a stopper of various types of multiple-layer metal gaskets.
Figure 7:
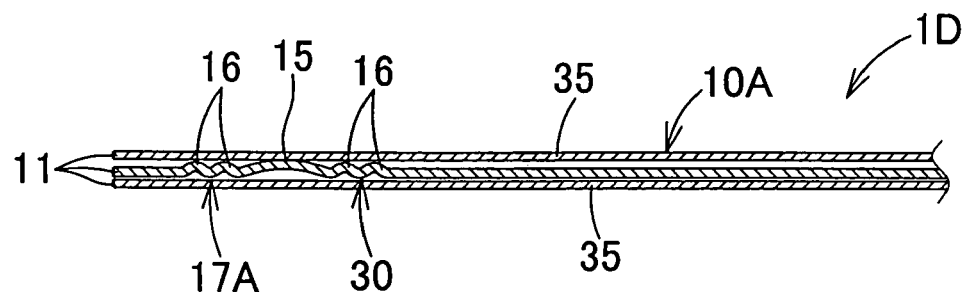
Figure 7:
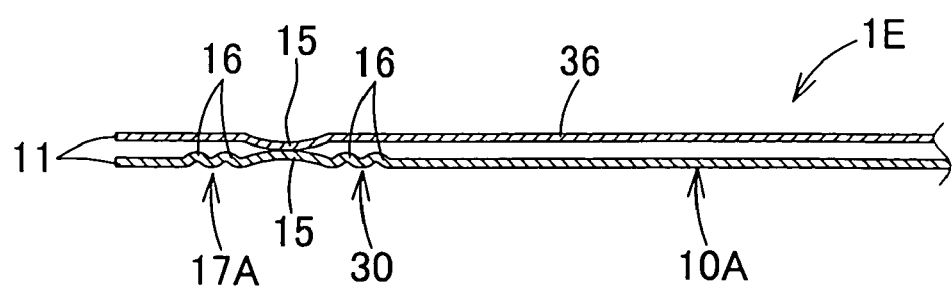

Specifically, FIG. 7A shows a metal gasket 1C, for example, in which a substantially flat gasket component sheet 35 is laid over the surface of the gasket component sheet 10A according to the second embodiment which includes the projecting side of the combustion chamber bead 15. Alternatively, FIG. 7B shows a metal gasket 1D, in which a flat gasket component sheet 35 is laid over the opposite surfaces of the gasket component sheet 10A according to the second embodiment. Yet further alternatively, FIG. 7C shows a metal gasket 1E, in which a gasket component sheet 36 having a combustion chamber bead 15 is laid over the surface of the gasket component sheet 10A according to the second embodiment which includes the projecting side of the combustion chamber bead 15, such that the both combustion chamber beads 15 abut against each other. Further, a metal gasket may be constructed by superposing the gasket constituent sheet 35 or 36 on the gasket component sheet 10 or 10B instead of the gasket component sheet 10A.

Figure 8:
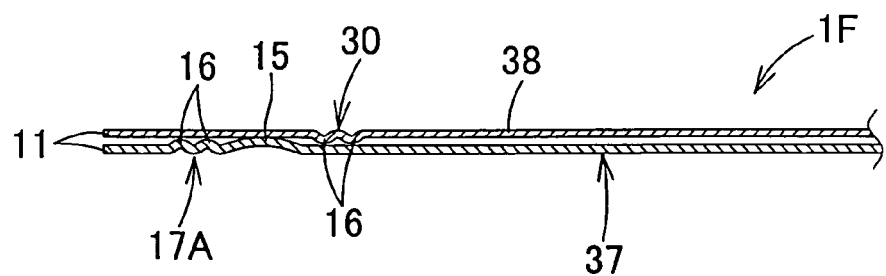
FIGS. 8A through 8D are longitudinal sectional views showing the vicinity of a stopper of various types of multiple-layer metal gaskets with other configurations.
Figure 8:
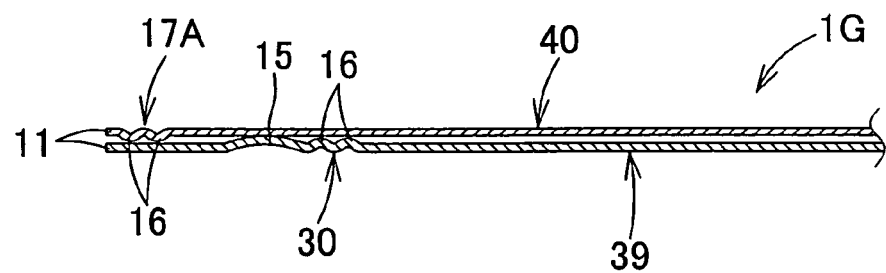
Figure 8:
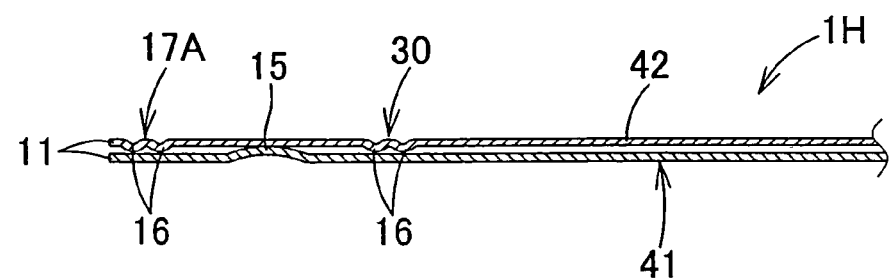
Figure 8:
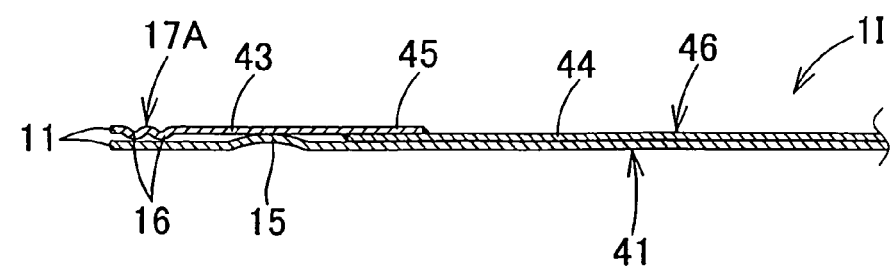

Further, FIG. 8A shows a metal gasket 1F, for example, in which a gasket component sheet 37 obtained by omitting the outer circumference side stopper 30 from the gasket component sheet 10A according to the second embodiment is laid over a gasket component sheet 38 obtained by omitting the combustion chamber bead 15 and inner circumference side stopper 17A from the gasket component sheet 10A according to the second embodiment. Alternatively, FIG. 8B shows a metal gasket 1G, in which a gasket component sheet 39 obtained by omitting the inner circumference side stopper 17A from the gasket component sheet 10A of the second embodiment is laid over a gasket component sheet 40 obtained by omitting the combustion chamber bead 15 and outer circumference side stopper 30 from the gasket component sheet 10A of the second embodiment. Further alternatively, FIG. 8C shows a metal gasket 1H, in which a first gasket component sheet 41 obtained by omitting the inner circumference side stopper 17 and outer circumference side stopper 30 from the gasket component sheet 10A of the second embodiment is laid over a gasket component sheet 42 obtained by omitting the combustion chamber bead 15 from the gasket component sheet 10A of the second embodiment. Yet further alternatively, FIG. 8D shows a metal gasket 1I, in which the gasket component sheet 41 is laid over a second gasket component sheet 46 that is formed by dividing the gasket component sheet 42 as used in the metal gasket 1H into an inner circumference side component sheet 43 surrounding the opening 11 and an outer circumference side component sheet 44 corresponding to the other part, and providing, in place of the outer circumference side stopper 30, an overlapped portion 45 of these component sheets 43 and 44. When a plurality of gasket component sheets are superposed in this manner, the outer circumference side stopper 30 may be substituted with a build-up portion that is formed by depositing a synthetic resin material or metallic material having thermal resistance and compressive resistance by means of pattern printing, material application with a dispenser, or metal flame spray coating, or by welding a ring-shaped plate serving as the stopper 17.

Figure 9:
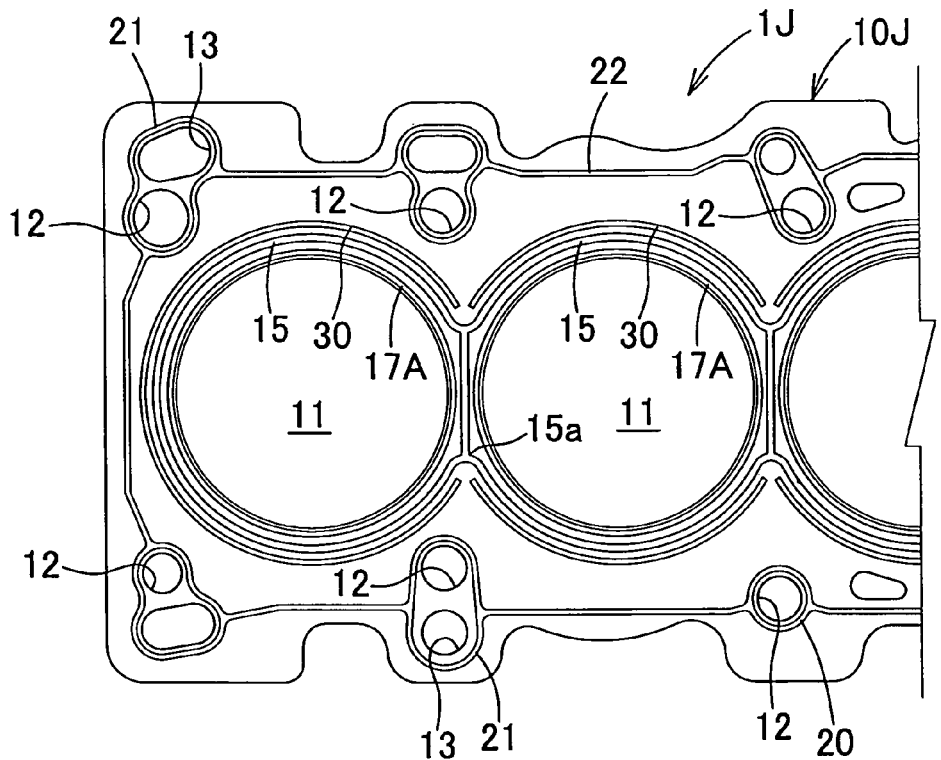
FIG. 9 is a plan view showing principal parts of a metal gasket having another configuration.
Figure 10:
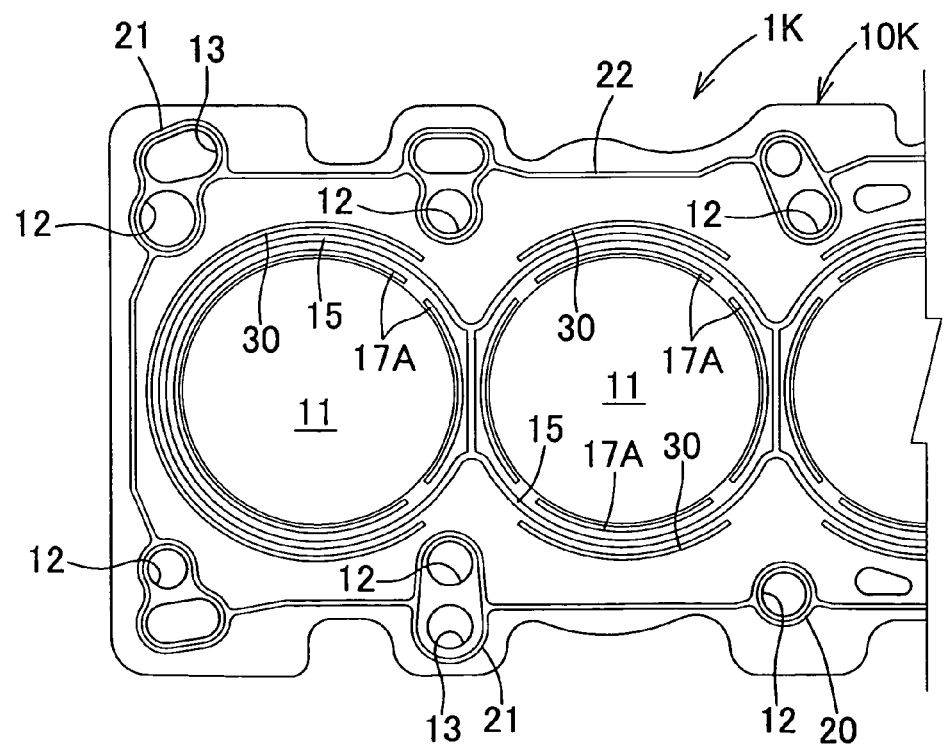
FIG. 10 is a plan view showing a metal gasket having another configuration.

In the second embodiment described above, the inner circumference side stopper 17A is formed into a complete circle shape centered on the opening 11 while the outer circumference side stopper 30 is formed into a continuous ring shape defined by a combination of complete circle shape portions centered on the opening 11. Alternatively, as a gasket component sheet 10J for a metal gasket 1J shown in FIG. 9, the outer circumference side stopper 30 may be omitted in the vicinity of a merging portion 15a where the combustion chamber beads 15 surrounding the adjacent openings 11 merge with each other so that the outer circumference side stopper 30 is formed intermittently. Further alternatively, as a gasket component sheet 10K for a metal gasket 1K shown in FIG. 10, the outer circumference side stopper 30 and inner circumference side stopper 17A may be omitted in the vicinity of the bolt insertion holes 12 so that the these stoppers 17A and 30 are formed intermittently. Further, it is also possible in the gasket component sheet 10 of the first embodiment which is provided with the inner circumference side stopper 17 only and not with the outer circumference side stopper 30, to adjust the contact pressure by omitting the inner circumference side stopper 17 in the vicinity of the portion where a head bolt is tightened.

Figure 11:
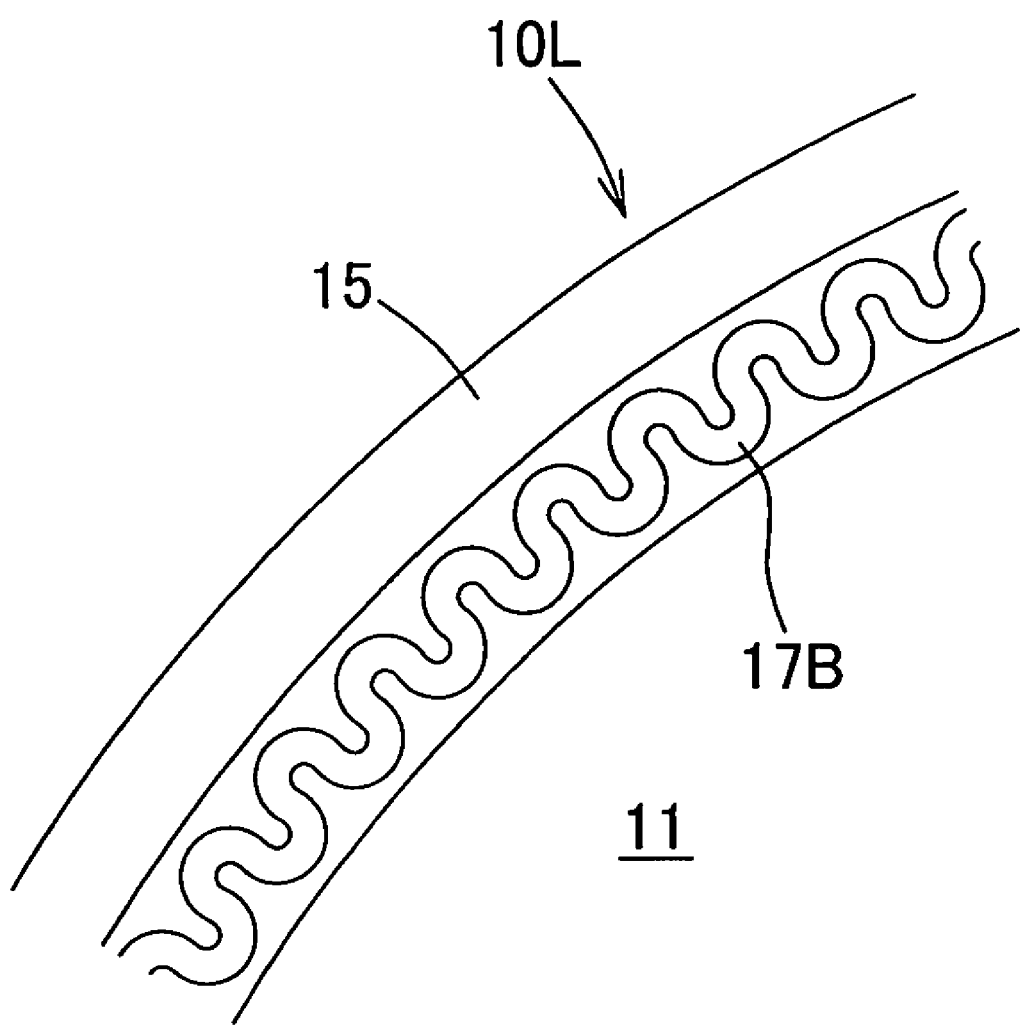
FIG. 11 is a plan view showing the vicinity of a stopper of a gasket component sheet with another configuration.

Still further, as a gasket component sheet 10L shown in FIG. 11, an inner circumference side stopper 17B may be formed into a wave shape that oscillates in a radial direction in place of the inner circumference side stopper 17 or 17A formed into a complete circle shape. Although not shown in the drawings, the outer circumference side stopper 30 also may be formed in a wave shape oscillating in a radial direction. In this case, the contact pressure can be adjusted by adjusting the width or height of the waves.

It should be noted that, although the description so far has been made on a metal gasket composed of one to three gasket component sheet(s), the present invention is also applicable to a metal gasket constituted by layering four or more gasket component sheets. In a metal gasket constituted by a plurality of gasket component sheets in this manner, these gasket component sheets layered on top of another are joined integrally by means of an eyelet or mechanical clinch at a portion not including the joint surfaces 4 and 5 of the cylinder block 2 and cylinder head 3, for example at a portion outside of the joint surfaces 4 and 5 of the cylinder block 2 and cylinder head 3, or at a portion where the water jacket 7 is arranged.

In the present embodiment, the present invention is applied to a metal gasket that is mounted between a cylinder block 2 and the cylinder head 3 of an in-line multiple-cylinder engine. However, the present invention is also applicable to a single-cylinder engine or V-engine. The present invention is also well applicable to an air pump or the like, in addition to such various types of engines.

Fourth Embodiment

Figure 12:
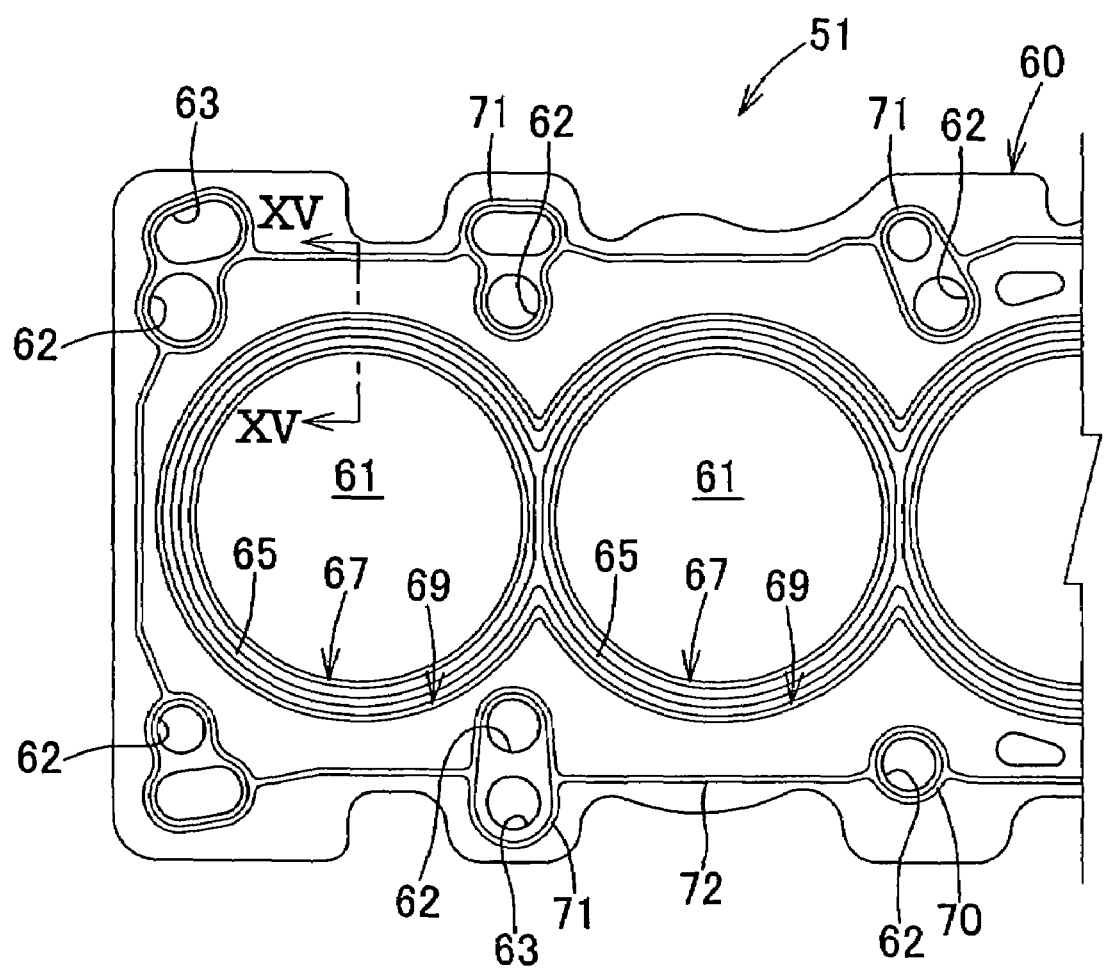
FIG. 12 is a plan view showing principal parts of a metal gasket.
Figure 13:
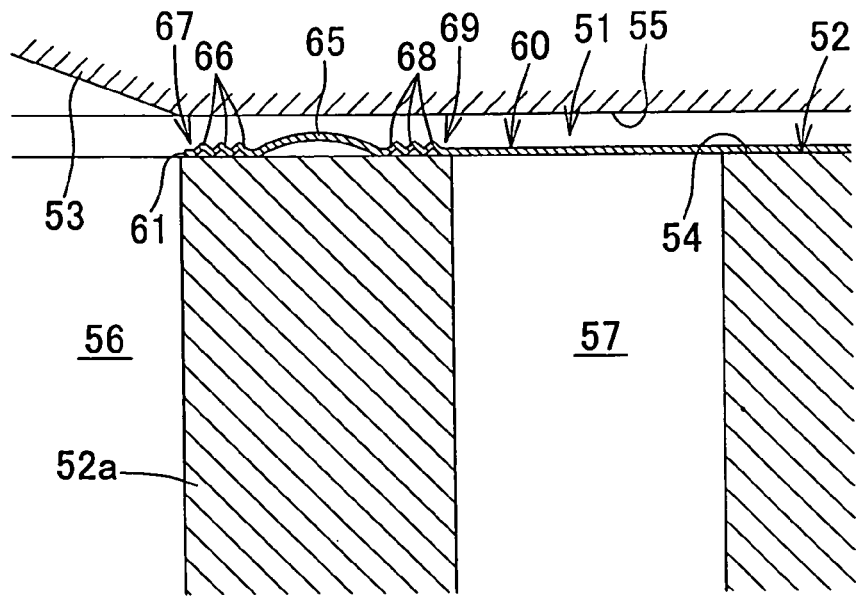
FIG. 13 is a longitudinal sectional view of an engine showing the vicinity of a stopper in the state immediately before a cylinder head is attached to a cylinder block.
Figure 14:
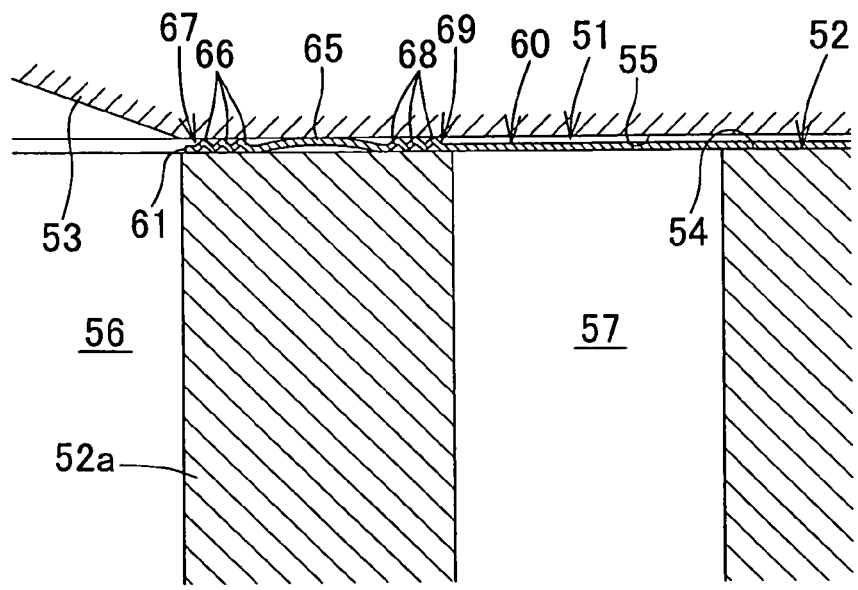
FIG. 14 is a longitudinal sectional view of the engine showing the vicinity of the stopper in the state after the cylinder head has been attached to the cylinder block.
Figure 15:
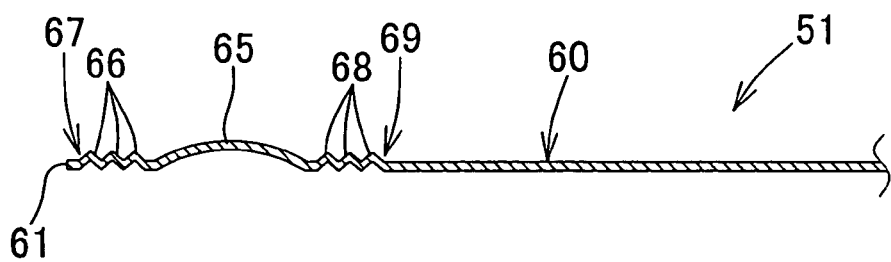
FIG. 15 is a sectional view taken along the line XV—XV in FIG. 1.

FIG. 12 shows a metal gasket 51 used for in-line multiple-cylinder engines. This metal gasket 51 is designed, as shown in FIGS. 13 and 14, such that the metal gasket 51 is interposed between joint surfaces 54 and 55 of a cylinder block 52 and a cylinder head 53 to seal the joint surfaces 54 and 55 facing a combustion chamber 56, a water jacket (not shown), and a lubricating oil passage (not shown). While the metal gasket 51 according to the present invention is applicable to engines having a cylinder block 52 made from cast iron, it is more suitably applicable to engines having a cylinder block 52 and a cylinder head 53 which are principally made from a light alloy such as an aluminum alloy or magnesium alloy. Particularly, the metal gasket of the present invention is suitably applicable to open deck type engines having a water jacket 57 the top face of which is open. This is because the metal gasket of the present invention is capable of effectively preventing the reduction of circularity of the inner peripheral wall 52a of the cylinder block 52 constituting a combustion chamber 56, which is liable to occur in this type of engines.

The metal gasket 51 is, as shown in FIGS. 12 through 15, constituted by a single gasket component sheet 60 that is interposed between the joint surfaces 54 and 55 of the cylinder block 52 and the cylinder head 53 so as to cover substantially all over these joint surfaces.

The gasket component sheet 60 is made of a sheet of SUS301 stainless steel or the like, and the outline of gasket component sheet 60 is shaped into a substantially identical shape to that of the joint surface 54 of the cylinder block 52. If the thickness of the gasket component sheet 60 is less than 0.15 mm, the rigidity of the bead is too low to provide a sufficient contact pressure, whereas if it is more than 0.4 mm, cracks may occur as a result of deterioration of the material caused by processing or excessive tightening of head bolts. Therefore, the thickness of the gasket component sheet 60 is preferably set to a range from 0.15 to 0.4 mm, more preferably to a range from 0.15 to 0.35 mm, and particularly preferably to a range from 0.2 to 0.25 mm. While the gasket component sheet 60 may be constituted by a metal sheet only, it also can be constituted by a coated metal sheet obtained by coating at least one of the surfaces of the gasket component sheet 60 with a rubber coating layer or the like for improving the sealing performance of the metal gasket 51.

A plurality of openings 61 are formed in a substantially central portion in the width direction of the gasket component sheet 60, while being spaced from each other to face a combustion chamber 56. On the outside of each of the opening 61, a plurality of cooling water holes (not shown) are formed in a predetermined arrangement so as to face a water jacket 57 of the cylinder block 52. On the outside of the cooling water holes, a plurality of bolt insertion holes 62, through which head bolts (not shown) are inserted for fastening the cylinder head 53 to the cylinder block 52, are formed at substantially equal intervals so as to surround the openings 61, whereby the cylinder head 53 can be fastened to the cylinder block 52 in a well-balanced manner. An oil hole 63 for passing lubricating oil is formed on the outside of a specific bolt insertion hole 62 so that a valve mechanism and the like can be lubricated by supplying lubricating oil from the cylinder block 52 to the cylinder head 53.

The gasket component sheet 60 has a combustion chamber bead 65 surrounding the combustion chamber 56, an inner circumference side stopper 67 composed of a plurality of inner auxiliary beads 66 arranged on the inner side the combustion chamber bead 65, an outer circumference side stopper 69 composed of a plurality of outer auxiliary beads 68 arranged on the outer side from the combustion chamber bead 65, a bolt hole bead 70 surrounding the bolt insertion hole 62, a bolt/oil hole bead 71 surrounding of the bolt insertion hole 62 and oil hole 63 together, and an outer circumferential bead 72 surrounding the whole of the bolt hole beads 70 and bolt/oil hole beads 71. It should be noted that the outer circumferential bead 72 may be formed not to surround the bolt hole beads 70 or bolt/oil hole beads 71 as long as it surrounds the cooling water holes. Additionally, the bolt hole bead 70, the bolt/oil hole bead 71, and the outer circumferential bead 72 may be constituted either by a round bead having a circular arc section or by a stepped bead with a stepped shape.

In the gasket component sheet 60, the shapes, numbers and arrangements of the openings 61, cooling water holes, bolt insertion holes 62, and oil holes 63, as well as the shapes, numbers and arrangements of the combustion chamber beads 65, bolt hole beads 70, bolt/oil hole beads 71 and outer circumferential beads 72 may be set arbitrarily in accordance with the configuration of the engine or the like.

The inner circumference side stopper 67 and the outer circumference side stopper 69 are formed into a triangular wave-shaped cross section by three auxiliary beads 66 and 68, respectively, which are formed substantially concentrically with the combustion chamber bead 65. The amplitude of the waves of the auxiliary beads 66 and 68 is set to a value smaller than the width of the combustion chamber bead 65, and the height of the waves is set lower than the height of the combustion chamber bead 65 in its natural state. The auxiliary beads 66 and 68 are thus designed so that they are hardly compressively deformed under a load exerted when the cylinder head 53 is fastened to the cylinder block 52 with head bolts.

The stoppers 67 and 69 and the combustion chamber bead 65 are arranged to face the top face of a cylindrical cylinder inner peripheral wall 52a of the cylinder block 52 that is arranged closer to the combustion chamber 56 than the water jacket 57. The combustion chamber bead 65 is arranged in a substantially central portion in the thickness direction of the cylinder inner peripheral wall 52a, and the inner circumference side stopper 67 and outer circumference side stopper 69 are spaced from the combustion chamber bead 65 by a substantially same distance.

In addition to the triangular-wave shape, the cross-sectional shape of the stoppers 67 and 69 may be any shape such as a sine-wave or rectangular-wave shape. However, it is preferable that the stoppers 67 and 69 be formed similarly to the inner circumference side stopper 17 of the first embodiment described above. While the number of the inner and outer auxiliary beads 66 and 68 may be set to any value, it is preferable to set the number to at least two or more for ensuring the functions as stoppers. While the height of the auxiliary beads 66 and 68 may be set to an identical value, it is preferable to set the height of the inner auxiliary beads 66 to be slightly higher than the height of the outer auxiliary beads 68 in order to enhance the air tightness of the combustion chamber 56. While the inner and outer auxiliary beads 66 and 68 may be projected to the opposite direction from the direction the combustion chamber bead 65 is projected, it is preferable that the auxiliary beads 66 and 68 be projected to the same direction as the combustion chamber bead 65 is projected in order to allow the auxiliary beads 66 and 68 to exhibit their function as stoppers for the combustion chamber bead 65 fully.

This metal gasket 51 is incorporated into an engine by fastening the cylinder head 53 to the cylinder block 52 by means of head bolts with the metal gasket 51 interposed between the cylinder block 52 and the cylinder head 53. In this case, a gap is formed by the stoppers 67 and 69 in the vicinity of the combustion chamber bead 65 such that the height of the gap substantially corresponds to the height of the auxiliary beads 66 and 68. As a result, the metal gasket 51 is not compressed until the combustion chamber bead 65 comes into close contact with the top face of the cylinder inner peripheral wall 52a. Therefore, the stress amplitude of the combustion chamber bead 65 during operation of the engine is reduced, and hence it is possible to prevent the deterioration of sealing performance caused by flattening or cracks of the combustion chamber bead 15. Additionally, the tightening load from the head bolt is distributed over and exerted in a well-balanced manner to the top face of the cylinder inner peripheral wall 52a by the combustion chamber bead 65 and stoppers 67 and 69. Therefore, the deformation in a radial direction of the cylinder inner peripheral wall 52a can be reduced to improve the circularity of the cylinder hole and hence to improve the engine performance. Further, these stoppers 67 and 69 are by the stoppers 67 and 69 since they can be formed integrally with the gasket component sheet 60 by press molding or the like. Moreover, since this type of metal gasket is free from problems such as sheet exfoliation, the durability of the engine can be improved.

Figure 16:
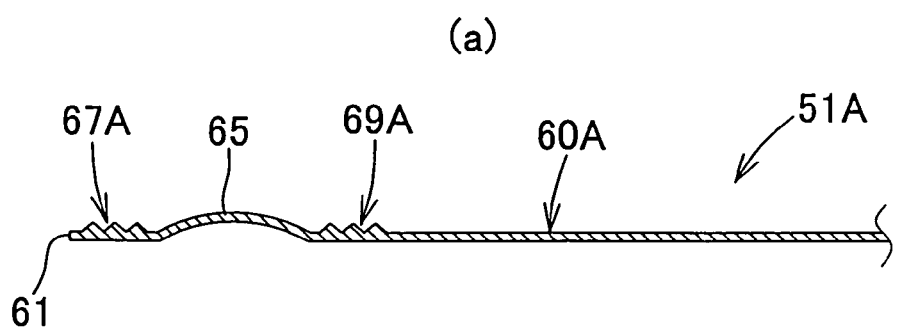
FIGS. 16A and 16B are views corresponding to FIG. 15 but showing metal gaskets with different configurations therefrom.
Figure 16:
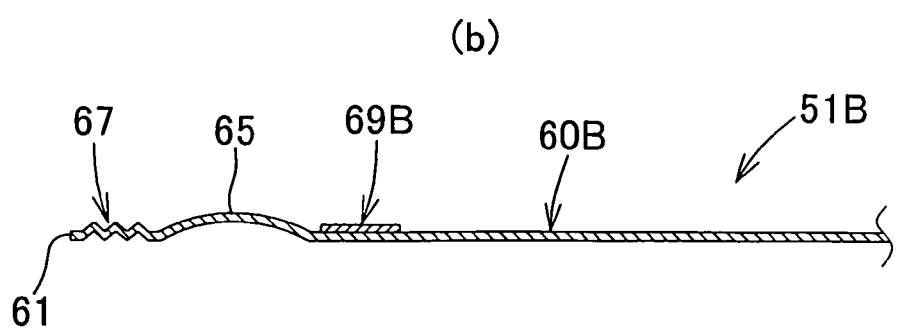

It should be noted that, as a metal gasket 51A shown in FIG. 16A, an inner circumference side stopper 67A and an outer circumference side stopper 69A may be provided in place of the stoppers 67 and 69, the inner and outer circumference side stoppers 67A and 69A being formed to have a flat surface on one side and wave-shaped surface on the other side by adjusting the thickness of the gasket component sheet 60A. Additionally, since the thermal resistance and other properties required for the outer circumference side stopper 69 are not as high as those for the inner circumference side stopper 67, a metal gasket 51B may be formed, as shown in FIG. 16B, by a gasket component sheet 60B having no outer circumference side stopper 69 and this gasket component sheet 60B may be provided with an outer circumference side stopper 69B formed by depositing a synthetic resin material or metallic material having thermal resistance and compressive resistance by means of pattern printing, metal flame spray coating, or material application with a dispenser, or by welding a ring-shaped stopper plate.

Figure 17:
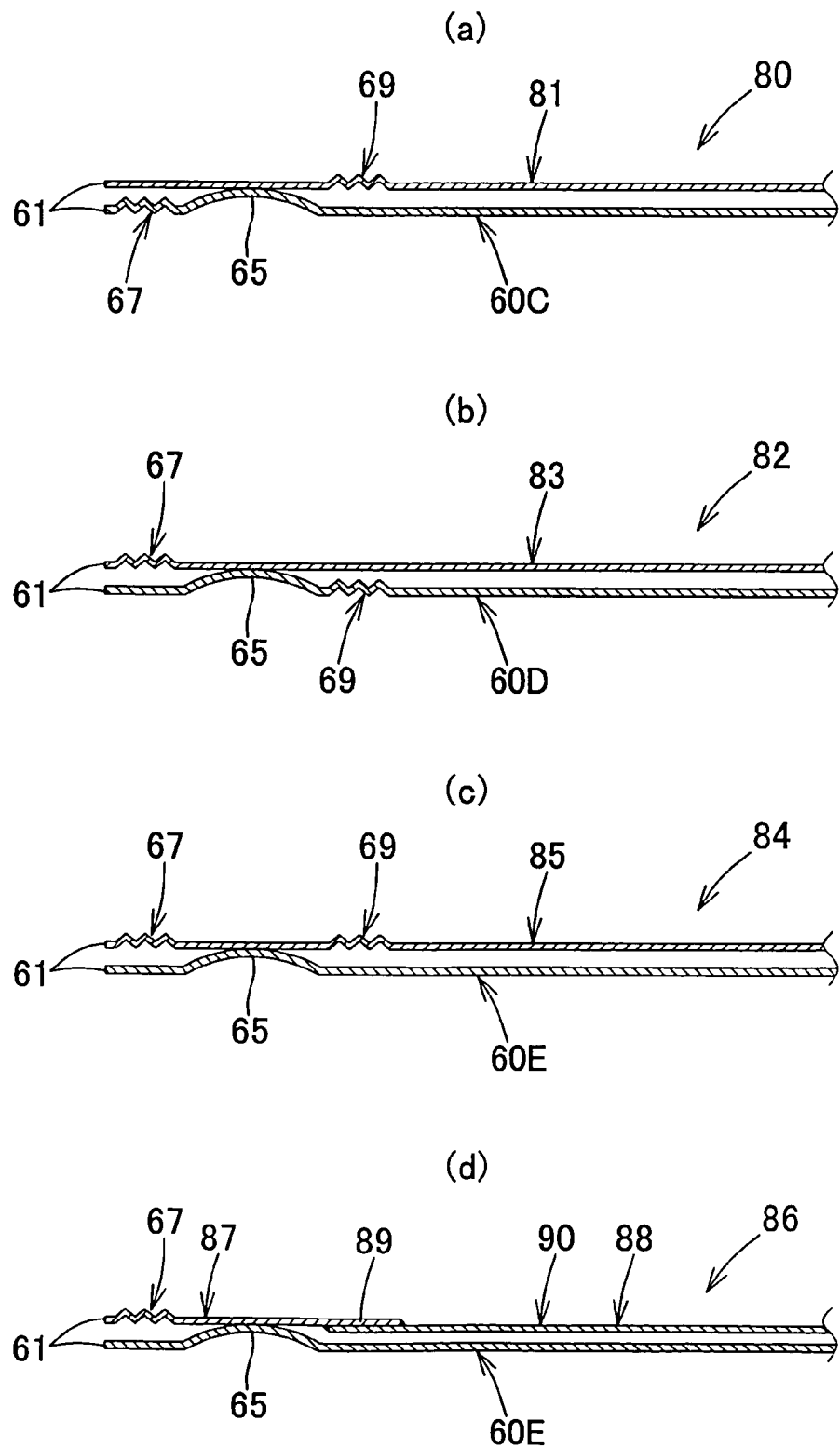
FIGS. 17A through 17D are views corresponding to FIG. 15 but showing metal gaskets with different configurations therefrom.

Further, the metal gasket 51 may be constituted by a plurality of gasket component sheets 60. When the metal gasket 51 is constituted by two gasket component sheets, for example, the gasket component sheet 60 as described above may be laid directly over another gasket component sheet. Alternatively, as a metal gasket 80 shown in FIG. 17A, a first gasket component sheet 60C having a combustion chamber bead 65 and an inner circumference side stopper 67 but no outer circumference side stopper 69 may be laid over a second gasket component sheet 81 having an outer circumference side stopper 69. Further alternatively, as a metal gasket 82 shown in FIG. 17B, a first gasket component sheet 60D having a combustion chamber bead 65 and outer circumference side stopper 69 but no inner circumference side stopper 67 may be laid over a second gasket component sheet 83 having an inner circumference side stopper 67. Yet further alternatively, as a metal gasket 84 shown in FIG. 17C, a first gasket component sheet 60E having a combustion chamber bead 65 but no inner circumference side stopper 67 or outer circumference side stopper 69 may be laid over a second gasket component sheet 85 having an inner circumference side stopper 67 and an outer circumference side stopper 69.

Further, when two gasket component sheets are overlapped in this manner, similarly to the embodiments described above, the outer circumference side stopper 69 may be provided with an outer circumference side stopper 69A having a flat surface on one side and a wave-shaped surface on the other side, or with an outer circumference side stopper 69B formed by depositing a synthetic resin material or metallic material having thermal resistance and compressive resistance by means of pattern printing, metal flame spray coating, or material application with a dispenser, or by welding a ring-shaped stopper plate. Still further, when the second gasket component sheet 60 is provided with an outer circumference side stopper 69, as a metal gasket 86 shown in FIG. 17D, the first gasket component sheet 60E or 10C may be laid over a second gasket component sheet 90 that is divided into an inner circumference side component sheet 87 surrounding the combustion chamber 56 and an outer circumference side component sheet 88 corresponding to the other part, and providing, in place of the outer circumference side stopper 69, an overlapped portion 89 of these component sheets 87 and 88.

The description of the fourth embodiment has been made so far on metal gaskets of single-layer and two-layer configurations. However, the present invention is also applicable to a metal gasket having three or more gasket component sheets layered on top of another. In such metal gasket having a plurality of gasket component sheets, these plurality of gasket component sheets layered on top of another are joined integrally by means of an eyelet or mechanical clinch at a portion not including the joint surfaces 54 and 55 of the cylinder block 52 and cylinder head 53, for example at a portion outside of the joint surfaces 54 and 55 of the cylinder block 52 and cylinder head 53, or at a portion where the water jacket 57 is arranged.

Further, in the fourth embodiment, the present invention is applied to the metal gasket 51 that is mounted between the cylinder block 52 and the cylinder head 53 of an in-line multiple-cylinder engine. However, the present invention is also applicable to a single-cylinder engine or V-engine. Further, the present invention is also well applicable to air pumps or the like in addition to engines.

What is claimed is:

1. A single-layer or multiple-layer metal gasket composed of a single or a plurality of gasket component sheet(s) having an opening to face a combustion chamber of an engine, at least one of the gasket component sheets being provided with a bead surrounding the opening, wherein an inner circumference side stopper with a wave-shaped cross section lower than the height of the bead is formed along the bead at least either in a portion between the bead and the opening of the gasket component sheet formed with the bead or in a portion of another gasket component sheet opposing the same, such that at least a section of each wave where stress amplitude is large becomes thin, a thin portion and a thick portion are arranged alternately in each wave, and the hardness of the thin portion is higher than that of the thick portion.

2. The metal gasket according to claim 1, wherein an outer circumference side stopper with a wave-shaped cross section lower than the height of the bead is formed along the bead at least either in a portion on the outer side from and close to the bead in the gasket component sheet formed with the bead or in a portion of another gasket component sheet opposing the same, such that at least a section of each wave where stress amplitude is large becomes thin, a thin portion and a thick portion are arranged alternately in each wave, and the hardness of the thin portion is higher than that of the thick portion.

3. The metal gasket according to claim 1, wherein a groove is formed along the section where stress amplitude is large such that the section becomes thin.

4. The metal gasket according to claim 1, wherein the thin portion is provided at the top and bottom of each wave while the thick portion is provided at an intermediate portion in the height direction of the opposite slopes of each wave.

5. The metal gasket according to claim 1, wherein the thin portion is provided on top side and bottom side portions of the opposite slopes of each wave, while the thick portion is provided at the top and bottom and at an intermediate portion in the height direction of the opposite slopes of each wave.

6. The metal gasket according to claim 1, wherein the thin portion is provided at the top and at a bottom side portion of the opposite slopes of each wave, while the thick portion is provided at the bottom and at an intermediate portion in the height direction of the opposite slopes of each wave.

7. The metal gasket according to claim 1, wherein the stopper is formed into a sine wave-shaped cross section.

8. The metal gasket according to claim 1, wherein the stopper is formed into a flattened wave-shaped cross section having a flat surface on the upper or lower face of the top or bottom of each wave.

9. The metal gasket according to claim 1, wherein the stopper is formed continuously or intermittently in the circumferential direction.

10. The metal gasket according to claim 1, wherein the height of the waves is varied in the circumferential direction of the stopper.

11. The metal gasket according to claim 1, wherein the number of the waves is varied in the circumferential direction of the stopper.

12. The metal gasket according to claim 1, wherein the waves of the stopper are projected to the same side as the bead is projected.

13. The metal gasket according to claim 1, wherein the wave of the stopper is formed into a complete circle shape or a wave shape which oscillates in a radial direction of the opening.

* * * * *